Aug. 15, 1961 J. A. O. STUB 2,996,121
RETRACTABLE AIRFOIL
Filed Oct. 27, 1958 4 Sheets-Sheet 1
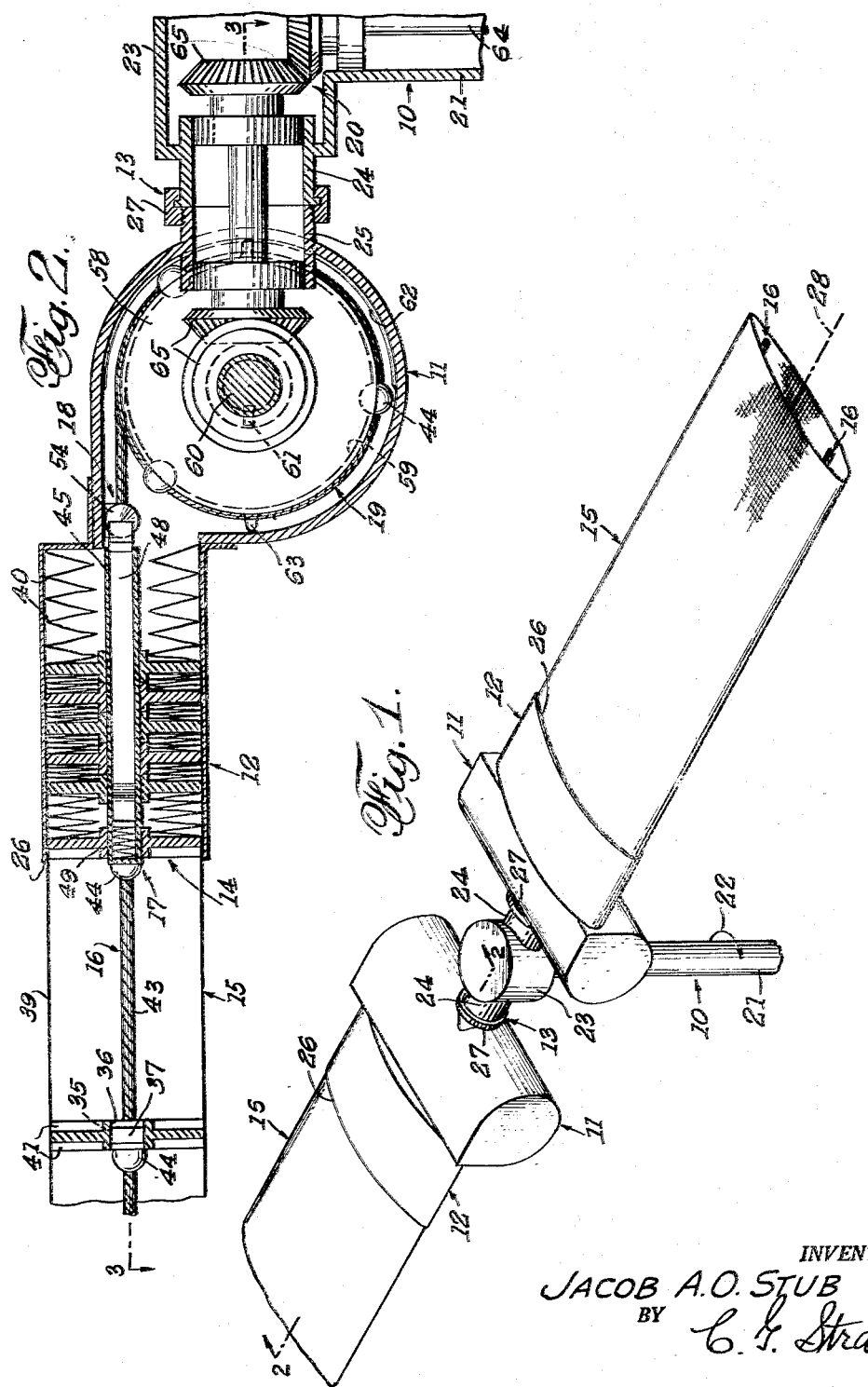
INVENTOR.
JACOB A. O. STUB
BY C. F. Stratton
ATTORNEY

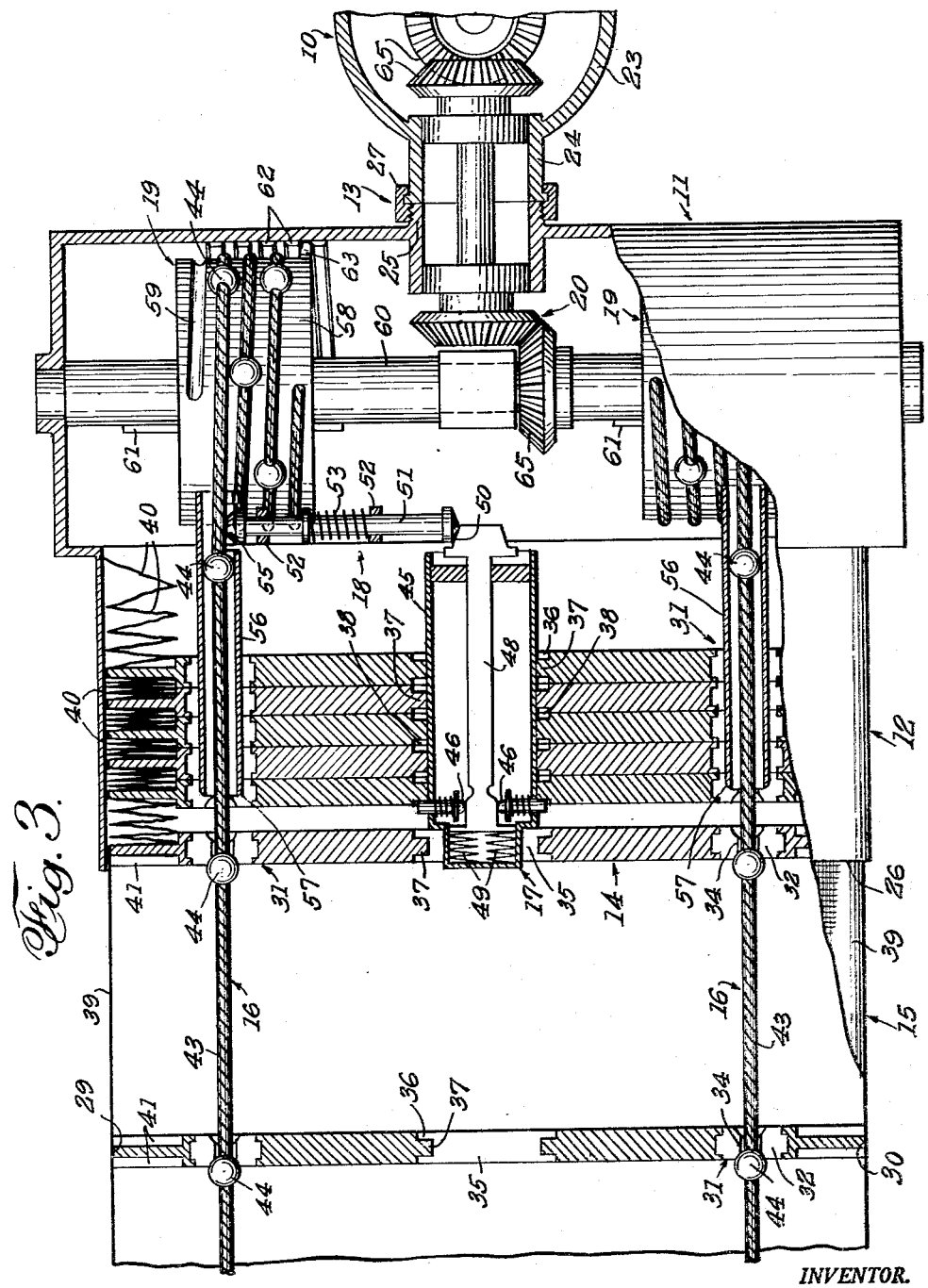

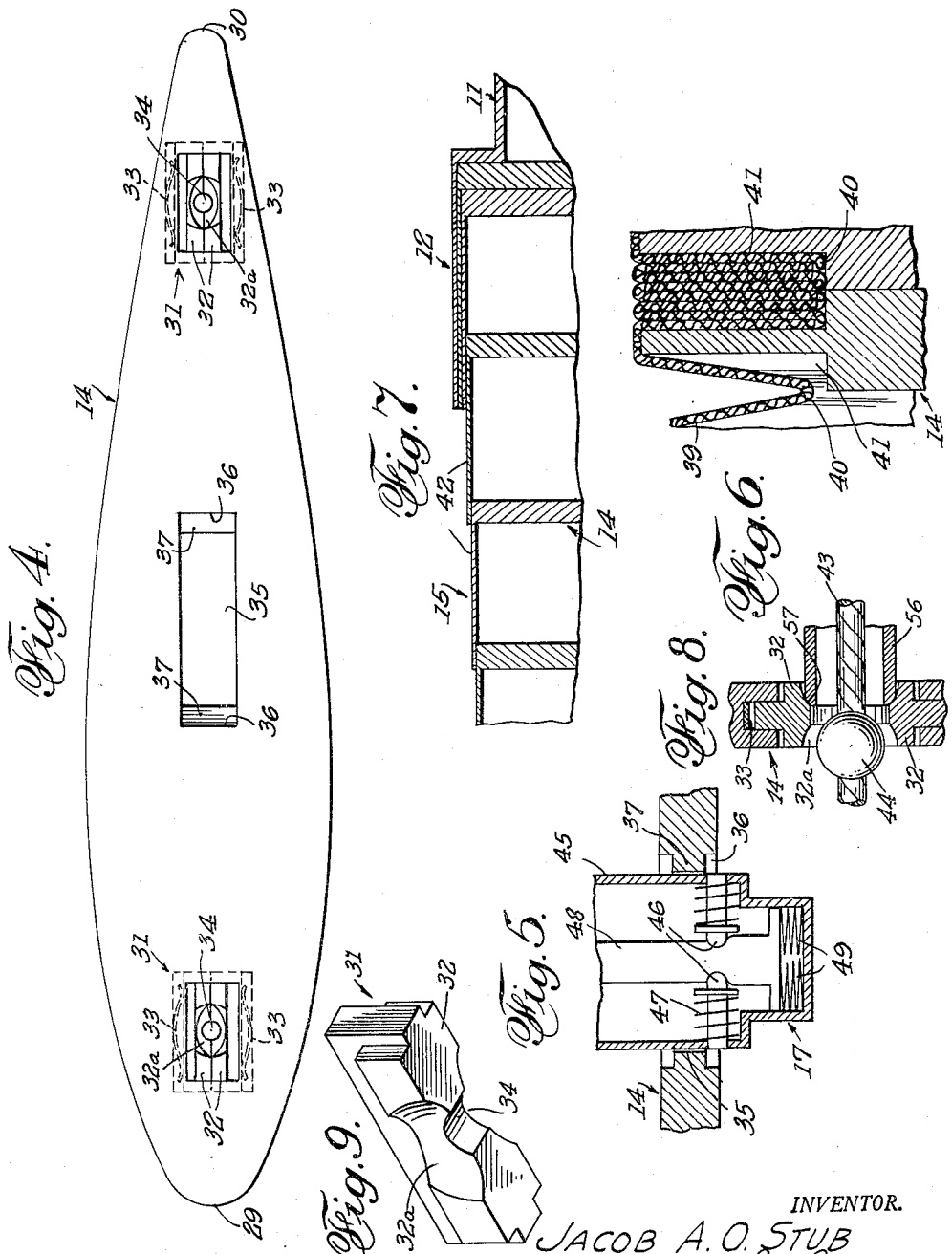

Aug. 15, 1961 J. A. O. STUB 2,996,121
RETRACTABLE AIRFOIL
Filed Oct. 27, 1958 4 Sheets-Sheet 4
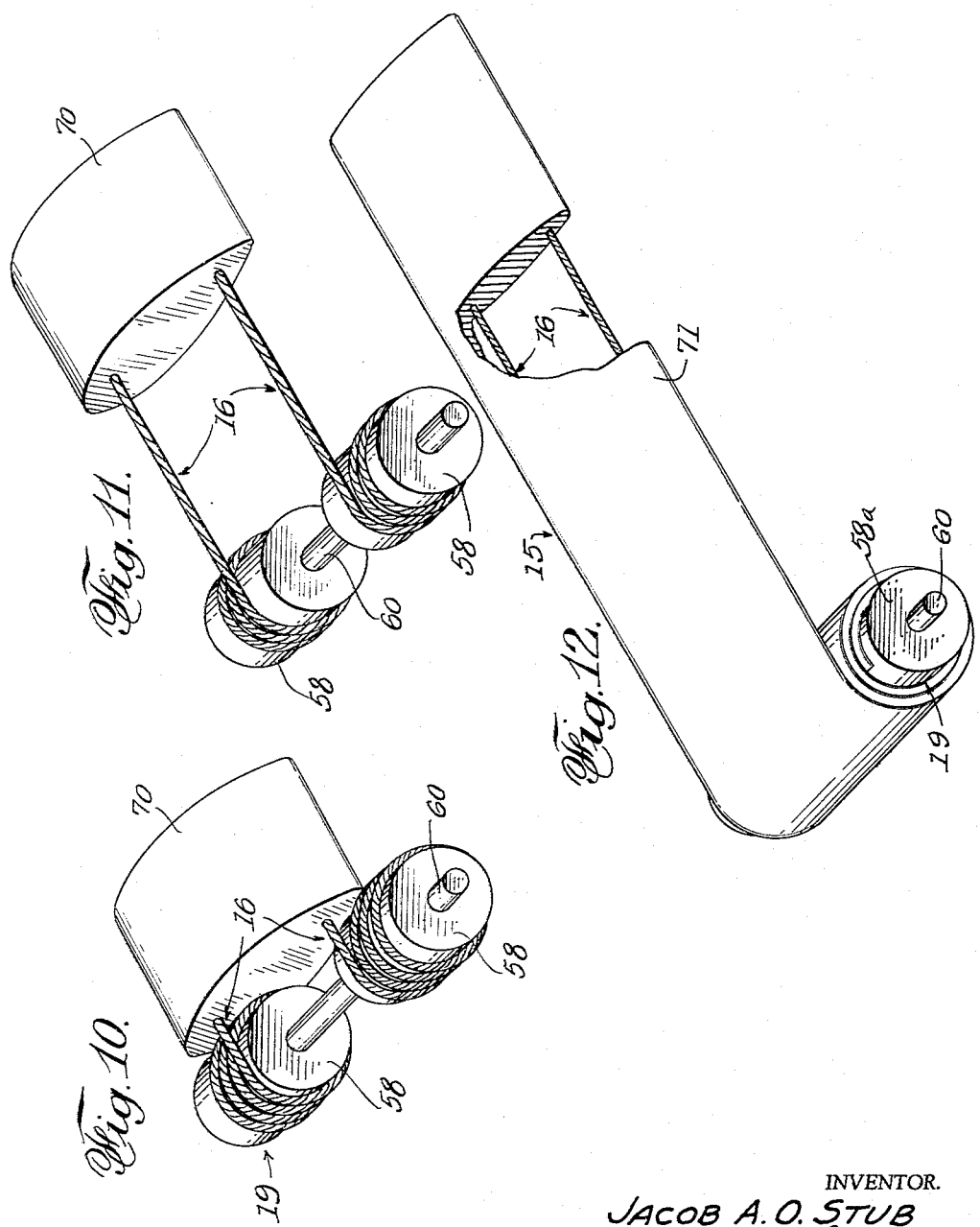
INVENTOR.
JACOB A. O. STUB
BY C. G. Stratton
ATTORNEY

United States Patent Office 2,996,121
Patented Aug. 15, 1961

2,996,121
RETRACTABLE AIRFOIL
Jacob A. O. Stub, Fullerton, Calif. (13421 Laurinda Way, Santa Ana, Calif.), assignor of twenty percent to Don Robert Christopher, Pasadena, Calif.
Filed Oct. 27, 1958, Ser. No. 773,536
8 Claims. (Cl. 170—160.11)

This invention relates to a retractable airfoil construction and more particularly to a rotary airfoil.

This application is a continuation-in-part of my pending application Serial No. 421,071, filed April 5, 1954, the same becoming abandoned December 5, 1958.

Centrifugal force applied to a weight or mass at the end of a flexible member results in said member being straight and radial with respect to the center of rotation of said weight or mass. The greater the centrifugal force, the greater the resistance of said member to flex. Consequently, the stiffness or rigidity of such a flexible member is a function of the speed of rotation. While the magnitude of the weight or mass also affects the mentioned rigidity of an otherwise flexible member, nevertheless, the weight being constant, the speed of rotation will govern rigidity.

The foregoing applies to a constant length flexible member which, therefore, has a uniform power arm. However, by varying the length of the flexible member and thus, of the power arm, the same weight or mass, on the end of such a flexible member, varies in magnitude of its centrifugal force, being increasingly greater as the flexible member is extended.

It is an object of this invention to provide a retractable rotary airfoil that embodies the principles of centrifugal force above mentioned and may be used either as the primary means for obtaining reaction of the air through which the same moves or as means secondary to other or fixed airfoils.

Another object of the invention is to provide a rotary airfoil having a plurality of sections or components and which maintains its air-lift form while under rotation and produces centrifugal force that imparts rigidity to otherwise flexible members that interconnect the sections.

A further object of the invention is to provide a rotary airfoil of the character above referred to that embodies novel and compact means to take in or pay out, as desired, the flexible members that are rendered rigid by centrifugal force and, thereby, contract or extend the airfoil, accordingly.

A still further object of the invention is to provide a rectractable air foil in which at least two side-by-side flexible and retractable spars are so connected or weighted at their outer ends that centrifugal force imposed thereon renders said spars rigidly taut, thereby providing adequate support for whatever airfoil surface or surfaces that may be placed around, over, under such spars or between the same.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

FIG. 1 is a perspective view of a retractable rotary airfoil according to the present invention, the ends thereof being broken away.

FIG. 2 is an enlarged longitudinal sectional view as taken on line 2—2 of FIG. 1.

FIG. 3 is a plan sectional view as taken on the line 3—3 of FIG. 2.

FIG. 4 is a face view of one of a plurality of ribs that comprise the present airfoil.

FIG. 5 is a further enlarged fragmentary plan sectional view of rib-latching means used in the present invention, the same being shown in release position.

FIG. 6 is a still larger scale sectional view showing one manner of spanning between the ribs of the airfoil structure to provide the air-engaging surfaces of said airfoil.

FIG. 7 is a similar sectional view showing a modification of the ribs-spanning means.

FIG. 8 is an enlarged, detailed sectional view with parts broken away, showing how the spreader 56, 57 separates the slide blocks.

FIG. 9 is an enlarged bottom perspective view of a slide block.

FIG. 10 is a semi-diagrammatic perspective view showing a retracted airfoil in a manner illustrating the principles of the present invention.

FIG. 11 is a similar view showing said airfoil partly extended.

FIG. 12 is a perspective view showing an alternate form of the air foil illustrated in FIGS. 10 and 11, the same being shown as providing support or lift surfaces extending for the entire effective length of the foil.

The airfoil structure that is illustrated in FIGS. 1 to 9 comprises, generally, a rotary support 10, a housing 11 extending from each side of said support and rotational around the axis of said support, an open-ended extension 12 on each said housing 11, the open ends thereof being opposite and outwardly directed, an angularly adjustable mount 13 interconnecting support 10 and each housing 11, a set of nesting ribs 14 retractable into each said extension 12, means 15 spanning between the ribs, flexible spar means 16 holding the ribs, when extended from extension housing 12, in suitable spaced relation to form an airfoil, means 17 to latch the ribs in nested position, latch retracting means 18, means 19 to take in and pay out the flexible spar means, and means 20 to drive the means 19.

The rotary support 10 is here shown as a hollow column or mast 21 that is adapted to be mounted in or on the framework of an aircraft so as to be either freely rotational or rotationally driven as indicated by the arrow 22. At its upper end, said mast is shown as provided with an enlarged housing 23 having lateral oppositely directed hubs 24.

Each housing 11 is generally tubular in form and its longitudinal extent is transverse to the axis of support 10. Intermediate its ends, each housing has a hub 25 to interfit with hubs 24 of support 10.

The open-ended extensions 12 are shown as offset upwardly from the axial center of housings 11 and the same have their open ends 26 directed outwardly.

In practice, the housings 11 may be non-adjustably affixed to support 10 and, under certain conditions, this may be the case. However, in order to vary the angle of the longitudinal extent of said housings 11 with relation to the horizontal (providing support 10 is vertical), the adjustable means 13 is provided and is shown as a coupling or union 27 interconnecting the hubs 24 and 25. While not shown, suitable means may be provided to tilt each housing 11 on the axis that extends through hub 25. As will be understood from the description which follows, the line on which the airfoil may vary its angle of incidence is represented in FIG. 1 by line 28.

The ribs 14 may vary in form. As shown in FIG. 4, the same may have a stream-lined or tear-drop shape common to airfoil design. Accordingly, each such rib may have a leading edge 29 and a trailing edge 30. Regardless of its specific aero-dynamic shape, each rib is of generally flat cross-sectional form and of a size to fit within extension 12. As seen in FIGS. 2 and 3, each set of ribs may stack or nest one against the other and, when so nested within each housing extension 12, presents a contracted structure having little or no purpose as an airfoil because of its foreshortened condition.

At each side, adjacent the edges 29 and 30, each rib is provided with a lock device 31 which is here shown as a pair of slide blocks 32 biased toward each other as by springs 33 and defining an opening 34 therebetween. The slide blocks 32 have spherical surfaces 32a on each side of the opening 34 to provide a cam means whereby the blades may be spread apart against the force of spring 33, as will be described more fully below.

Between lock devices 31, each rib is provided with an opening 35 that is shown as rectangular and, at the sides, has opposite rabbets 36 that define walls 37. As can be seen from FIG. 3, when the ribs 14 are in nested side-by-side position, the rabbets of adjacent ribs define seats such as indicated at 38.

The means 15 is shown in two forms which are exemplary of means to span between the ribs when extended as at the left of FIGS. 2 and 3 and as in FIG. 7. One form said means 15 may take comprises rib-enclosing sheathing 39 which, as best seen in FIG. 6, is provided with a plurality of accordion folds 40 that enable a compact contraction of the sheathing into recesses or pockets 41 provided in the marginal edges of ribs 14. The sheathing may be elastic, if desired, so as to stretch somewhat when the ribs are extended, or the same may be suitably impregnated fabric. The accordion form of fold is also exemplary since the sheathing may be rolled up or otherwise folded, provided the same effectively spans between the ribs and forms an airfoil surface when said ribs are extended.

As shown in the modification of FIG. 7, the means 15 may comprise rigid outwardly lateral extensions 42 of each rib. This necessitates reducing the size of the ribs progressively so that the extensions 42 may nest within each other.

As indicated in FIGS. 10 and 11 wherein a substantial part of the means 15 is omitted, said means may be provided without having operative relationship with ribs 14 but only with the spars 16. This is true also in FIG. 12 wherein the means 15 is shown as a mass or cover enclosing the spar means 16 and capable of being retracted and extended together with the spar means. The same will be more fully described below.

The spar means 16 is here shown as two cables 43 that are disposed to pass through the openings 34 in the lock devices 31 provided in ribs 14. The cables are shown as exemplary of any suitable flexible and substantially unstretchable members that are so limp as to be readily adapted to be rolled up or wound on a drum. The spar means 16 may further include a series of rib stops 44 affixed to each cable in the spaced relation desired for ribs 14 when the latter are extended.

The rib-latching means 17 is shown as a rigid rectangular projection 45 disposed within housing extension 12 in position to project through openings 35 of the ribs. Said projection is provided with oppositely directed latch pins 46 that are retracted within the projection 45 by springs 47 and are adapted to be projected by a slide latch cam 48 that is normally held in position by springs 49 to outwardly cam latch pins 46. This latter position is shown in FIG. 3. The retracted position of said pin is shown in FIG. 5, the cam 48 having been shifted.

The latch retracting means 18 is shown as a cam face 50 on the inward end of latch cam 48, an operating member 51 shown transverse to the longitudinal disposition of cam 48 and slidingly carried in housing 11, as in bearings 52, a retraction spring 53 for member 51 to retract a cam 54 on the end of said member and in operative engagement with cam face 50, a cam 55 on the opposite end of member 51 and directed to be in the path of movement of the rib stops 44 on one cable 43, and a fixed tube 56 through which said cable passes, the same extending in parallel relationship to projection 45. There are two tubes 56, one for each spar 16. However, only one member 51 is needed to obtain actuation of latch cam 48 by the rib stops 44 of one spar 16. The free end of each spar tube 56 is provided with a chamfer or bevel 57 which serves to spread the slide blocks 32 by contacting cam surface 32a thereof, and thus enable the ribs 14 to become strung on the spar tubes as indicated in FIG. 3.

The means 19 is shown as a drum 58 provided with a helical groove 59 in which cable 43 is adapted to be moved, as shown. One such drum is provided for each spar cable, the same residing in housing 11 and being mounted on a common shaft 60 on which they are adapted to slide, as on keys 61. Said drums rotate with shaft 60 because of keys 61.

The sliding movement of the drums is provided to retain an in-line-take-in or pay-out of the cable. One way of obtaining such sliding or shifting movement of the drums, as the same rotate, is by providing a full or even a partial helix 62 fixed within housing 11 and a lug or cog 63 on the drums engaged in said helices. Thus, as the drums are rotated by shaft 60, the same shift in one direction or the other according to the direction of drum rotation.

The drum-driving means 20 is here shown as a shaft 64 extending through support 10 and adapted to be driven in any suitable manner independently of any drive that may be provided for mast 21, and suitable gearing 65 interconnecting shaft 64 and shaft 60. It will be realized that the particular form of drive 20 may be varied, providing the same is operative whether or not the mast is rotating.

In operation, assuming all of the ribs 14 are retracted within housing extensions 12, rotation of the support 10 is initiated to create a centrifugal force on the ends of the device. This force is imposed on the outermost rib 14 of each of the sets thereof. Rotation is also imparted to drums 58 in a direction to pay off cables 43. The outermost rib is not latched in place by latch pins 46. Therefore, this rib will fly outward centrifugally as the rib stops 44 that hold it nested move outward. Consequently, the next rib stops 44 that unwind from the drums move outward in spar tubes 56 to a position outward of the next rib in the set. As said latter stops reach this position, the third rib stop 44 on each cable encounters cam 55 and shifts operating member 51 to cause projection of slide cam 48 and release of latch pins 46. These pins retract and allow said next rib to move outward as controlled by the rib stops thereinfront.

Since said third rib stops quickly pass by cam 55, the operating member is retracted by spring 53 to its initial position enabling springs 49 to in turn retract cam 48 and again project pins 46. Thus, the next succeeding rib is held latched until the latch pins 46 are again retracted as before.

In this manner, the ribs are successively released from housing extension 12 until the airfoil has achieved its full length. The centrifugal force on the ribs progressively increases as the same move further from the center or axis of rotation and said force has magnitude to so tension cables 43 that said cables, while comprised of flexible elements, are rigid in the nature of spars.

As before explained, the airfoils thus provided may be pivoted on axis 28 to vary the angle of attack of leading edge 29.

By driving the drums 59 in the opposite direction while continuing to revolve the airfoil around the axis of the support mast, the ribs 14 can be successively retracted into housing extension 12. The reverse of the procedure above outlined occurs, the rib stops 44, now moving in the opposite direction, serve to effect retraction of latch pins 46 so that the next rib stops may move the ribs onto projection 45 and behind the latch pins. Simultaneously, the chamfered ends 57 of spar tubes 56 spread slide blocks 32 by contacting cam surface 32a, thus allowing the rib stops to move on by as the retractive movement of the ribs is arrested.

In this manner, the ribs 14 are successively retracted until all of them are housed within extensions 12.

From the foregoing, it will be realized that the present airfoil depends on its rigidity in operation on the flexible spar means 16 becoming rigid members in tension when centrifugal force is imposed thereon. Thus, the airfoil, generally, comprises at least two flexible, side-by-side and generally coextensive members, and means connecting the end of said members and constituting the weight or mass that renders the members rigid in operation. In other words, even if only the outer ends of the spar means 16 are connected by an airfoil member 70, as in FIGS. 10 and 11, the resultant device would be an efficient airfoil of which the efficiency would be commensurate with the area of the air-contacting surface of the member 70. Since, as hereinbefore stated, centrifugal force is largely a function of the speed of rotation of a mass about an axis, the mass of member 70 may be made to suit particular conditions. The primary function of member 70 is to connect the ends of the spars 16 so the latter retain their side-by-side relationship and integration of the airfoil.

While FIGS. 10 and 12 do not show airfoil surfaces between member 70 and where the spars 16 are connected, as to drums 58, it will be realized that means that have such surfaces may be provided in connection with the spars, either spanning between them or in other ways being connected to retract, wind up on the drums 58, or be taken up independently on separate drums as the spars are wound up.

Since the spars are flexible and remain rigidly in tension only under centrifugal force, the means 19, as shown, or comparable means, is advantageously provided to foreshorten the spars and the airfoil as rotation is to be stopped. Hence, when sagging of the airfoil is not desired, the take-in and pay-out means 19 is essential to the structure. The drums 58 shown in FIGS. 10 and 11 are merely diagrammatic representations of the drums shown in FIGS. 2 and 3, the same being mounted to rotate about an arrow similar to arrow 22 of FIG. 1.

It will be seen that the form of FIG. 12 varies from that of FIGS. 10 and 11 in that the spars 16 are embedded or enclosed in means 71 that provides the airfoil with suitable air-contacting surfaces. Said means 71 may, in addition to being flexible, be pliable or compressible so as to be capable of being wound on a drum 58a together with the spars 16 therein. Said means 71, or at least the outer end thereof, connects the spars as in the forms hereinbefore described. It will be noted that the means 19, in this case, is shown as comprising a single drum 58a in which the spars 16 and airfoil means 71 are wound up together. In other respects, the construction may follow the foils hereinabove described.

The absence of ribs 14 from the forms of FIGS. 10 and 11 and FIG. 12 is to be noted, and that the airfoil is capable of operating without such members, because entire dependence may be placed on the power of centrifugal force to hold the foil straight while whirling centrifugally. Adjustment on the axis 28 may be had as before, the integrated construction having desired rigidity to accomplish this.

The ribs 14 and spars 16 have been shown as one means for effecting contraction or extension of the airfoil surface. Therefore, the means for effecting contraction and extension of the air-engaged surfaces may be varied, as above indicated. For instance, collapsible former members or other such means may be built into the airfoil and designed to assume desired shape when extended from a contracted condition.

The retractable rotary airfoil, in its various forms above described, may have at least three different uses:

(a) As a high lift device for aircraft to be used under emergency landing conditions.

(b) As a high lift device to be used on conventional aircraft for landing and take-off purposes.

(c) As a retractable airfoil on rotary wing aircraft.

In use a above the support mast need not be connected to a power source and the same may be motivated by airflow. In the event of power or other failure necessitating emergency landing, the airfoil would be energized and extended to provide an autorotative device enabling safe vertical or near vertical descent.

In use b, the device would be used in conjunction with a power source and would be cut into operation during landings and take-offs to assist the primary airfoils and enable take-off from shorter runways. After such use, the same way be retracted.

The use c should be quite evident since the same, except for retractability of the device, is more or less similar to helicopter wings.

Helicopter and/or autogiro wings or airfoils are frequently articulated, as around the fore and aft or lag hinges, and the hinges to vary the coning angle. Also, articulation relative to angles of incidence, attack, etc. It is contemplated that the present airfoil may be similarly mouned.

Since the present means, when retracted, may not be in operative use, the entire assembly or major portions thereof may be retracted into a housing or the fuselage of the vehicle.

While the foregoing illustrates and describes what is now contemplated to be the best mode of carrying out the invention, the construction is, of course, subject to modification without departing from the spirit and scope of the invention. It is, therefore, not desired to restrict the invention to the particular form of construcion illusrated and described, but to cover all modifications that may fall within the scope of the appended claims.

Having thus described my invention, what is claimed and desired to be secured by Letters Patent is:

1. A retractable airfoil comprising a plurality of transverse rib members normally retracted in side-by-side arrangement, means to house said members when so retracted, means to latch said members in said housing means, means to rotate said housing means to impose centrifugal force on said members, means mounting said housing means for angular adjustment relative to the axis of rotation of said housing, spar means interconnecting the members and comprising at least two elongated flexible elements rendered rigid by centrifugal force, means longitudinally spanning between the ribs and comprising a cover for said ribs, means to extend said spar means, and cooperating means on the spar means and the rib members to control extension of the rib members outwardly of the housing means during rotation of said housing.

2. A retractable airfoil comprising a plurality of transverse ribs disposed in side-by-side contiguity when the airfoil is retracted, two flexible members extending through said ribs and arranged in longitudinal, transversely spaced relation, means to rotate the plurality of ribs to impose centrifugal force thereon, means releasably interconnecting the ribs and flexible members, means to retract and extend said flexible members, during rotation of said ribs, and means covering said ribs when spaced during extension thereof to provide air-contacting surfaces.

3. An airfoil according to claim 2 in which is provided a drum on which said flexible members are wound when holding the ribs in contiguity.

4. An airfoil according to claim 2 in which is provided a housing that encircles the ribs when the flexible members are retracted, and means to releasably latch the ribs when so housed.

5. A retractable airfoil comprising a plurality of transverse ribs disposed in side-by-side contiguity when the airfoil is retracted, two flexible members extending through said ribs and arranged in longitudinal, transversely spaced relation, means to rotate the plurality of ribs to impose centrifugal force thereon, means releasably connecting the ribs and flexible members, means to retract and extend said flexible members during rotation of said ribs, means covering said ribs when spaced during extension thereof to provide air-contacting surfaces, a drum on which each flexible member is wound when holding the ribs in contiguity and from which said members are unwound when the ribs are extended, means to mount each drum, means to rotate said drum on its mount, and means to slide said drum along its axis of rotation during rotation thereof.

6. A retractable rotative wing comprising a plurality of ribs, spar means releasably engaging with said ribs, said spar means comprising a pair of flexible members which stiffen under centrifugal force resulting from rotation of the wing and a series of stops placed on said flexible members in a predetermined spaced relation, a drum connected with the spar means and on which said means is adapted to be wound, said drum being operable to selectively retract and extend said spar means to vary the length of the wing, and locking means on said ribs releasably engaging said stops.

7. A wing according to claim 6 in which is provided rib-latching means to releasably latch the ribs when retracted, and means to release the rib-latching means, said means being operated by the spar means.

8. A retractable airfoil comprising a plurality of ribs adapted to be disposed in side-by-side contiguity, at least one flexible member extending through said ribs, means to rotate the plurality of ribs to impose centrifugal force thereon, means releasably interconnecting the ribs and flexible member, means to retract and extend said flexible member during rotation of said ribs, and means covering said spaced ribs to provide air-contacting surfaces, wherein said means releasably interconnecting said ribs and said flexible member comprises a pair of slide blocks on said ribs and a plurality of stops in spaced relationship on said flexible member.

References Cited in the file of this patent

UNITED STATES PATENTS

| | | |
|---|---|---|
| 1,718,577 | Pitcairn | June 25, 1929 |
| 1,922,866 | Rosenberg | Aug. 15, 1933 |
| 2,108,245 | Ash | Feb. 15, 1938 |
| 2,163,482 | Cameron | June 20, 1939 |
| 2,172,333 | Theodorsen | Sept. 5, 1939 |
| 2,637,406 | Isacco | May 5, 1953 |
| 2,713,393 | Isacco | July 19, 1955 |

FOREIGN PATENTS

| | | |
|---|---|---|
| 647,564 | Great Britain | Dec. 13, 1950 |